US008224017B2

(12) United States Patent
Shi et al.

(10) Patent No.: US 8,224,017 B2
(45) Date of Patent: Jul. 17, 2012

(54) METHOD FOR IDENTIFYING MARKED CONTENT

(75) Inventors: Yun-Qing Shi, Millburn, NJ (US); Dekun Zou, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 945 days.

(21) Appl. No.: 11/331,688

(22) Filed: Jan. 13, 2006

(65) Prior Publication Data

US 2007/0189600 A1 Aug. 16, 2007

(51) Int. Cl.
*G06K 9/00* (2006.01)
*G06K 9/62* (2006.01)
*H04L 9/32* (2006.01)
*H04N 1/40* (2006.01)

(52) U.S. Cl. ........ 382/100; 382/238; 382/181; 382/159; 713/176; 358/3.28

(58) Field of Classification Search .................. 382/159, 382/100, 238, 181; 713/176; 358/3.28
See application file for complete search history.

(56) References Cited

U.S. PATENT DOCUMENTS

| 5,381,513 | A | * | 1/1995 | Tsuboka ........................ 704/232 |
| 5,533,138 | A | | 7/1996 | Kim et al. |
| 5,757,306 | A | * | 5/1998 | Nomura ........................ 341/200 |
| 6,628,821 | B1 | * | 9/2003 | Covell et al. .................. 382/155 |
| 6,868,186 | B1 | * | 3/2005 | Sadeh ............................ 382/238 |
| 6,990,217 | B1 | * | 1/2006 | Moghaddam et al. ........ 382/118 |
| 7,200,592 | B2 | * | 4/2007 | Goodwin et al. ................. 707/6 |
| 2002/0183984 | A1 | | 12/2002 | Deng et al. |
| 2004/0005077 | A1 | * | 1/2004 | Bilobrov et al. ............... 382/100 |
| 2004/0066964 | A1 | * | 4/2004 | Neubauer et al. ............. 382/152 |
| 2005/0100244 | A1 | * | 5/2005 | Wang et al. ................... 382/286 |
| 2005/0220336 | A1 | * | 10/2005 | Sabe et al. ..................... 382/159 |
| 2005/0265452 | A1 | * | 12/2005 | Miao et al. ............... 375/240.16 |
| 2006/0104504 | A1 | * | 5/2006 | Sung ............................. 382/159 |
| 2007/0177791 | A1 | | 8/2007 | Shi et al. |
| 2008/0281764 | A1 | * | 11/2008 | Baxter ............................ 706/12 |

OTHER PUBLICATIONS

Baxes, Digital Image Processing: Principles and Applications, 1994, John Wiley and Sons, pp. 352-353.*
International Search Report and Written Opinion, PCT/US06/01393, Jul. 15, 2008.
J. Fridrich et al., "Steganalysis of JPEG Images: Breaking the F5 Algorithm", 5th Information Hiding Workshop, 2002, pp. 310-323.
R. Chandramouli et al., "Analysis of LSB based image steganographytechniques", Proc. of ICIP 2001, Oct. 7-10, 2001.
S. Lyu et al., "Detecting Hidden Messages Using Higher-Order Statistics and Support Vector Machines," 5th International Workshop on Information Hiding, Noordwijkerhout, The Netherlands, 2002.
K. Sullivan, et al., "Steganalysis of Spread Spectdrum Data Hiding Exploiting Cover Memory," SPIE2005, vol. 5681, pp. 38-46.
C. Cortes et al., "Support-vector networks," Machine Learning, 20, 273-297, Kluwer Academic Publishers, 1995.

(Continued)

*Primary Examiner* — Kathleen Y Dulaney
(74) *Attorney, Agent, or Firm* — Connolly Bove Lodge & Hutz LLP

(57) ABSTRACT

A method of processing images, including: training an image classifier to obtain a trained classifier, the training including: forming multiple prediction error sets from neighboring samples of a set of known images, a prediction error for each pixel of the error sets being formed by subtracting a predicted pixel value from an original value; thresholding the formed prediction error sets; and training the image classifier using the thresholded prediction error sets.

26 Claims, 2 Drawing Sheets

(a) Transition model for Prediction-error image $E_h$ (b) Transition model for Prediction-error image $E_v$ (c) Transition model for Prediction-error image $E_d$

OTHER PUBLICATIONS

M. Rabbani et al., "An Overview of the JPEG2000 Still Image Compression Standard," Signal Processing: Image Communication 17 (2002) 3-48.

I. J. Cox et al., "Secure spread sprectrum watermarking for multimedia," IEEE, Trans. on Image Processing, 6, 12, 1673-1687 (1997).

A. Piva et al., "DCT-based watermark recovering without resorting to the uncorrupted original image," Proc. ICIP 97, vol. 1, pp. 520.

B. Chen et al., "Digital watermarking and information embedding using dither modulation," Proceedings of IEEE MMSP 1998, pp. 273-278.

C. Chang et al., "LIBSVM: a library for support vector machines," 2001, http://www.csie.ntu.edu.tw/-cjlin/libsvm.

J. Fridrick. "Reliable Detection of LSB Steganography in Color and Grayscale Images" 3333.

* cited by examiner (a) Transition model for Prediction-error image $E_h$ (b) Transition model for Prediction-error image $E_v$ (c) Transition model for Prediction-error image $E_d$

METHOD FOR IDENTIFYING MARKED CONTENT

FIELD

This application is related to classifying or identifying content, such as marked content, for example.

BACKGROUND

In recent years digital data hiding has become an active research field. Various kinds of data hiding methods have been proposed. Some methods aim at content protection, and/or authentication, while some aim at covert communication. The latter category of data hiding is referred to here as steganography.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

DETAILED DESCRIPTION

Figure 1:
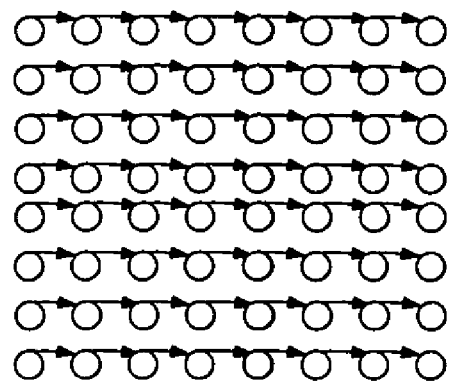
FIG. 1 is a schematic diagram illustrating one embodiment of a prediction error model as applied to content, such as an image.
Figure 1:
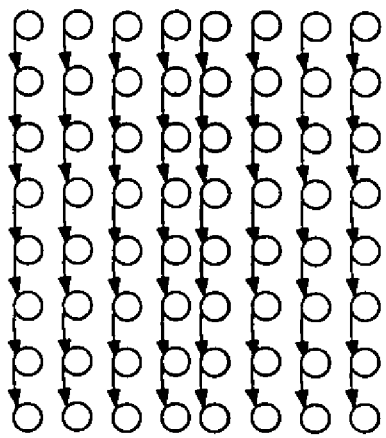
Figure 1:
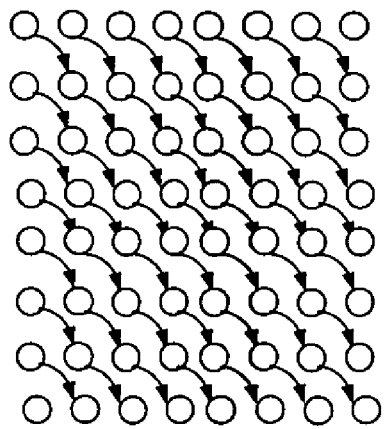

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In recent years digital data hiding has become an active research field. Various kinds of data hiding methods have been proposed. Some methods aim at content protection, and/or authentication, while some aim at covert communication. The latter category of data hiding is referred to in this context as steganography.

In J. Fridrich, M. Goljan and D. Hogea, "Steganalysis of JPEG Images: Breaking the F5 algorithm", 5th Information Hiding Workshop, 2002, pp. 310-323, (hereinafter "Fridrich et al."), Fridrich et al. have shown that the number of zeros in a block DCT domain of a stego-image will increase if the F5 embedding method is applied to generate the stego-image. This feature may be used to determine whether hidden messages have been embedded with the F5 method in content, for example. There are other findings regarding steganalysis of particularly targeted data hiding methods. See, for example, J. Fridrich, M. Goljan and R. Du, "Detecting LSB steganography in color and gray-scale images", Magazine of IEEE Multimedia Special Issue on Security, October-November 2001, pp. 22-28; and R. Chandramouli and N. Memon, "Analysis of LSB based image steganography techniques", Proc. of ICIP 2001, Oct. 7-10, 2001.

In S. Lyu and H. Farid, "Detecting Hidden Messages Using Higher-Order Statistics and Support Vector Machines," 5th International Workshop on Information Hiding, Noordwijkerhout, The Netherlands, 2002 (hereinafter, "Lyu and Farid"), Lyu and Farid proposed a more general steganalysis method based at least in part on image high order statistics, derived from image decomposition with separable quadrature mirror filters. The wavelet high-frequency subbands' high order statistics are extracted as features for steganalysis in this approach. Likewise, this approach has been shown differentiate stego-images from cover images with a certain success rate. Data hiding methods addressed by this particular steganalysis primarily comprise least significant bit-plane (LSB) modification type steganographic tools.

In K. Sullivan, U. Madhow, S. Chandrasekaran, and B. S. Manjunath, "Steganalysis of Spread Spectrum Data Hiding Exploiting Cover Memory", SPIE2005, vol. 5681, pp 38-46., (hereinafter, "Sullivan et al.") a steganalysis method based at least in part on a hidden Markov model is proposed. The empirical transition matrix of a test image is formed in such an approach. However, the size of the empirical transition matrix is large, e.g., 65536 elements for a grey level image with a bit depth of 8. Thus, the matrix is not used as features directly. The authors select several largest probabilities along the main diagonal together with their neighbors, and randomly select some other probabilities along the main diagonal as features. Unfortunately, some useful information might be ignored due at least in part to the random fashion of feature formulation. The data hiding methods addressed by Sullivan et al. related primarily to spread spectrum (SS) data hiding methods. Although these latter methods may not carry as much information bits as LSB methods in general, SS methods may be used in connection with covert communications, for example. In addition, SS methods are known to be more robust than LSB methods. Therefore, it is desirable to consider SS methods for steganalysis.

One embodiment of a steganalysis system based at least in part on a 2-D Markov chain of thresholded prediction-error sets for content, such as images, for example, is described below, although claimed subject matter is not limited in scope in this respect. In this particular embodiment, content samples, such as, for example, image pixels, are predicted with their neighboring pixels, and a prediction-error image, for example, is generated by subtracting the prediction value from the pixel value and thresholding. Empirical transition matrixes along the horizontal, vertical and diagonal directions of Markov chains may, in such an embodiment serve as features for steganalysis. Analysis of variance type approaches, such as, for example, support vector machines (SVM) or genetic processes, may be applied for classification or identification, although, again, claimed subject matter is not limited in scope in this respect.

Continuing with this particular embodiment, although claimed subject matter is not limited in scope to only one embodiment, a steganalysis system based at least in part on a Markov chain model of thresholded prediction-error images may be applied. Image pixels are predicted with the neighboring pixels. Prediction error in this particular embodiment is obtained by subtracting the prediction values from the pixel value. Though the range of the difference values is increased, the majority of the difference values may be concentrated in a relatively small range near zero owing to a correlation between neighboring pixels in unmarked images. In this context, the term marked content refers to content in which data has been hidden so that it is not apparent that the content contains such hidden information. Likewise, unmarked or cover content refers to content in which data has not been hidden. Large values in a prediction-error image, however, may be attributed at least in part to image content rather than data hiding. Therefore, a threshold applied to prediction error may reduce or remove large values in the prediction error images, thus limiting the dynamic range of a prediction-error image.

In this particular embodiment, although claimed subject matter is not limited in scope in this respect, prediction-error images may be modeled using a Markov chain. An empirical transition matrix is calculated and serves as features for steganalysis. Owing at least in part to thresholding, the size of empirical transition matrixes is decreased to a manageable size for classifiers so that probabilities in the matrixes may be included in feature vectors. For feature classification, an analysis of variance or other statistical approach may be applied. For example, an SVM process may be applied with both linear and non-linear kernels used for classification, as described in more detail below. In this context, the term "analysis of variance process" refers to a process in which differences attributable to statistical variation are sufficiently distinguished from differences attributable to non-statistical variation that correlation, segmentation, analysis, classification or other characterization of the data based at least in part on such a process may be performed.

While the term steganalysis may have a variety of meanings, for the purpose of this particular embodiment, it refers to a two-class pattern classification approach. For example, a test image may be classified as either a cover image, namely, information is not hidden in it, or a stego-image or marked image, which carries hidden data or hidden messages. Generally, in this particular approach or embodiment, the classification comprises two parts, although claimed subject matter is not limited in scope to employing only two classifications. Other approaches are possible and are included within the scope of claimed subject matter. Here, these parts are referred to as feature extraction and pattern classification, respectively. In many instances, it would be desirable to use the image itself for features in this process due at least in part to the large amount of information it contains. However, likewise, from a feasibility standpoint, the dimensionality of features may be too high for most classifiers. Therefore, feature extraction may be applied.

For computer vision type situations, it may be desirable for the feature to represent the shape and color of an object. For this particular embodiment, in contrast, other properties may provide useful information. In steganalysis, for example, it is desirable to have a feature contain information about changes incurred by data hiding as opposed to information about the content of the image.

Generally speaking, unmarked images, for example, may tend to exhibit particular properties, such as continuous, smooth, and having a correlation between neighboring pixels. Likewise, hidden data may be independent of the content itself. A watermarking process, for example, may change continuity with respect to the unmarked content because it may introduce some amount of random variation, for example. As a result, it may reduce correlation among adjacent pixels, bit-planes and image blocks. In this particular embodiment, it would be desirable if this potential variation that may be attributed to data hiding is amplified. This may be accomplished by anyone of a number of possible approaches and claimed subject matter is not limited in scope to a particular approach. However, below, one particular embodiment for accomplishing this is described.

Figure 2:
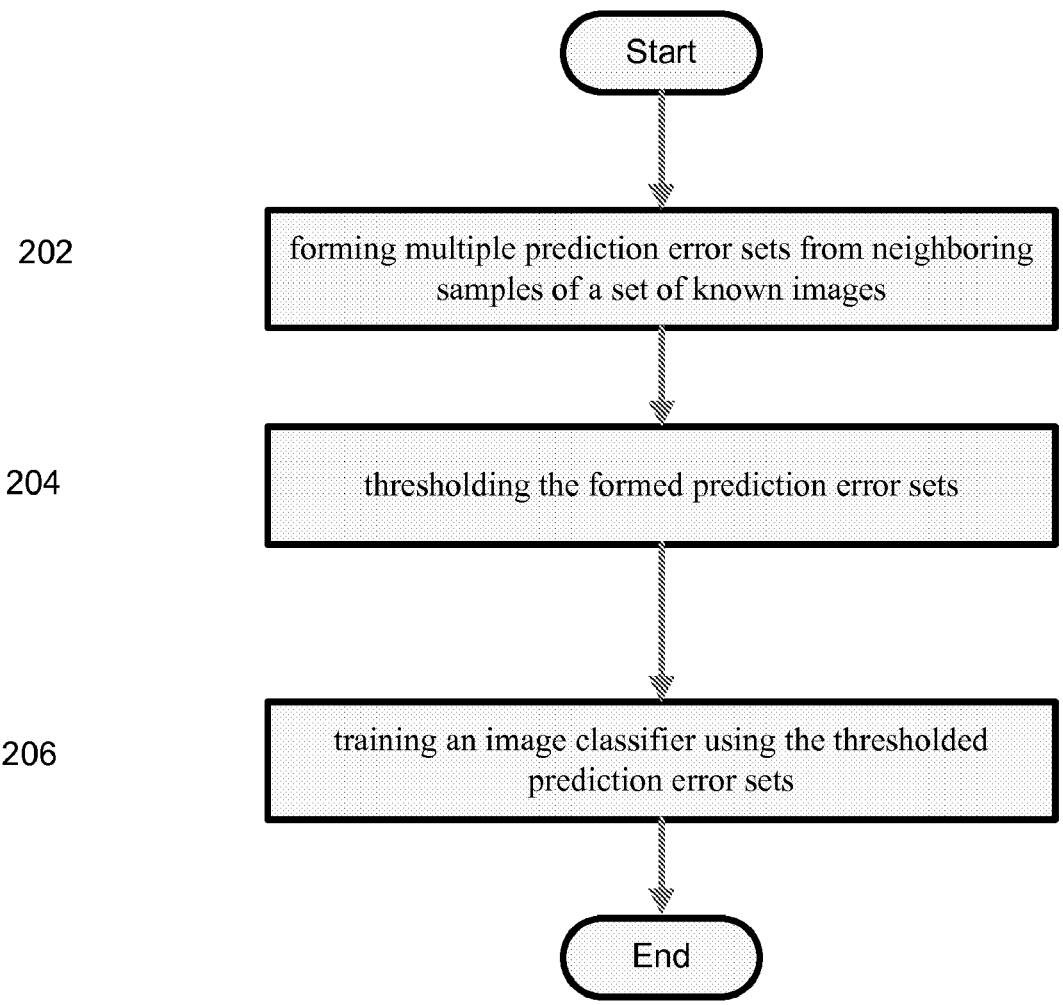
FIG. 2 illustrates an implementation in one embodiment of the prediction error model.

In this particular embodiment, neighboring pixels may be used to predict the current pixel, as indicated in FIG. 2, block 202. For this embodiment, the predictions may be made in three directions. Again, for this embodiment, these directions include horizontal, vertical and diagonal, although in other embodiments other directions are possible. For a prediction, prediction error may be estimated or obtained by subtracting a predicted pixel value from a original pixel value as shown in (1), $$e_h(i,j)=x(i+1,j)-x(i,j)$$

$$e_v(i,j)=x(i,j+1)-x(i,j)$$

$$e_d(i,j)=x(i+1,j+1)-x(i,j) \quad (1)$$

where $e_h$ (i, j) indicates prediction error for pixel (i, j) along a horizontal direction, $e_v$ (i, j) indicates prediction error for pixel (i, j) along a vertical direction and $e_d$ (i, j) indicates prediction error for pixel (i, j) along a diagonal direction, respectively. For a pixel of an image, we therefore estimate three prediction errors in this embodiment. At this point, prediction errors will form three prediction-error images denoted here by $E_h$, $E_v$ and $E_d$, respectively.

It is observed that potential distortions introduced by data hiding may usually be small compared with differences along pixels associated with, for example, the presence of different objects in an image. Otherwise, distortion itself may suggest hidden data if inspected by human eyes, thus potentially undermining the covert communication. Therefore, large prediction errors may tend to reflect more with respect to image content rather than hidden data. For this particular embodiment, to address this, a threshold T may be adopted the prediction errors may be adjusted according to the following rule:

$$e(i,j) = \begin{cases} e(i,j) & |e(i,j)| \le T \\ 0 & |e(i,j)| > T \end{cases} \quad (2)$$

The rule of equation (2) is shown in FIG. 2, block 204. It is noted, of course, that claimed subject matter is not limited in scope to this particular approach. Many other approaches to address the predication error are possible and intended to be included within the scope of claimed subject matter. Likewise, T depending, for example, on the particular embodiment, may not comprise a fixed value. For example, it may vary with time, location, and a host of other potential factors.

Nonetheless, continuing with this example, large prediction errors may be treated as 0. In other words, image pixels or other content samples may be regarded as smooth from the data hiding point of view. Continuing with this specific example, the value range of a prediction-error image is [−T, T], with 2*T+1 possible values.

Likewise, for this embodiment, a 2-D Markov chain model is applied to the thresholded prediction error images, rather than 1-D, for example. FIG. 1(a) is a schematic diagram illustrating an embodiment of transition model for horizontal prediction-error image $E_h$, in which a Markov chain is modeled along the horizontal direction, for example. FIG. 1(b) and FIG. 1(c) are schematic diagrams illustrating corresponding embodiments for $E_v$ and $E_d$, respectively. As suggested previously, and explained in more detail below, elements of the empirical transition matrices for $E_h$, $E_v$ and $E_d$ in this embodiment are employed as features. In FIG. 1, one circle represents one pixel. The diagrams show an image of size 8 by 8. The arrows represent the state change in a Markov chain.

A variety of techniques are available to analyze data in a variety of contexts. In this context, we use the term "analysis of variance process" to refer to processes or techniques that may be applied so that differences attributable to statistical variation are sufficiently distinguished from differences attributable to non-statistical variation to correlate, segment, classify, analyze or otherwise characterize the data based at least in part on application of such processes or techniques. Examples, without intending to limit the scope of claimed subject matter includes: artificial intelligence techniques and processes; neutral networks; genetic processes; heuristics; and support vector machines (SVM). As shown in FIG. 2, block 206 such classifier processes may be trained based on the above mentioned technique. This will be discussed further below.

Although claimed subject matter is not limited in scope to SVM or SVM processes, it may be a convenient approach for two-class classification. See, for example, C. Cortes and V. Vapnik, "Support-vector networks," in Machine Learning, 20, 273-297, Kluwer Academic Publishers, 1995. SVM may, for example, be employed to handle linear and non-linear cases or situations. For linearly separable cases, for example, an SVM classifier may be applied to search for a hyper-plane that separates a positive pattern from a negative pattern. For example, one may denote training data pairs $\{y_i, \omega_i\}$, i=1, . . . , l, where $y_i$ is a feature vector, and $\omega_i = \pm 1$ for positive/negative pattern.

For this particular embodiment, linear support vector processes may be formulated as follows. If a separating hyper-plane exists, training data satisfies the following constraints:

$$w^t y_i + b \geq 1 \text{ if } \omega_i = +1 \quad (3)$$

$$w^t y_i + b \leq -1 \text{ if } \omega_i = -1 \quad (4)$$

A Lagrangian formulation may likewise be constructed as follows:

$$L = \frac{1}{2}\|w\|^2 - \sum_{i=1}^{l} \alpha_i y_i (x_i \cdot w + b) + \sum_{i=1}^{l} \alpha_i \quad (5)$$

where $\alpha_i$ is the positive Lagrange multiplier introduced for inequality constraints, here (3) & (4). The gradient of L with respect to w and b provides:

$$w = \sum_{i=1}^{l} \alpha_i y_i \omega_i \text{ and } b = \frac{1}{l} \sum_{i=1}^{l} (\omega_i - w^t y_i) \quad (6)$$

In this embodiment, by training an SVM classifier, a sample z from testing data may be classified using w and b. For example, in one embodiment, if $$w^t z + b$$

is greater than or equal to zero, the image may be classified as having a hidden message. Otherwise, it may be classified as not containing a hidden message. Of course, this is a particular embodiment and claimed subject matter is not limited in scope in this respect. For example, conventions regarding positive, negative or functional form may vary depending on a variety of factors and situations.

For a non-linearly separable case, a "learning machine" may map input feature vectors to a higher dimensional space in which a linear hyper-plane may potentially be located. In this embodiment, a transformation from non-linear feature space to linear higher dimensional space may be performed using a kernel function. Examples of kernels include: linear, polynomial, radial basis function and sigmoid. For this particular embodiment, a linear kernel may be employed in connection with a linear SVM process, for example. Likewise, other kernels may be employed in connection with a non-linear SVM process.

Having formulated an embodiment system for identifying or classifying marked content, such as images, for example, it is desirable to construct and evaluate performance. However, again, we note that this is merely a particular embodiment for purposes of illustration and claimed subject matter is not limited in scope to this particular embodiment or approach.

For evaluation purposes, 2812 images were downloaded from the website of Vision Research Lab, University of California, Santa Barbara, see http://vision.ece.ucsb.edu/~sullivaklResearch_imgs/, and 1096 sample images included in the CorelDRAW Version 10.0 software CD#3, see www.corel.com. Thus, 3908 images were employed as a test image dataset. Color images were converted to grey level images applying an Irreversible Color Transform, such as illustrated by (7) below, see, for example, M. Rabbani and R. Joshi, "An Overview of the JPEG2000 Still Image Compression Standard", Signal Processing: Image Communication 17 (2002) 3-48:

$$Y = 0.299R + 0.587G + 0.114B \quad (7)$$

Typical data hiding methods were applied to the images, such as: Cox et al.'s non-blind SS data hiding method, see I. J. Cox, J. Kilian, T. Leighton and T. Shamoon, "Secure spread spectrum watermarking for multimedia," *IEEE. Trans. on Image Processing*, 6, 12, 1673-1687, (1997); Piva et al.'s blind SS, see A. Piva, M. Barni, E. Bartolini, V. Cappellini, "DCT-based watermark recovering without resorting to the uncorrupted original image", *Proc. ICIP 97*, vol. 1, pp. 520; and a generic quantization index modulation (QIM) data hiding method, see B. Chen and G. W. Wornell, "Digital watermarking and information embedding using dither modulation," *Proceedings of IEEE MMSP* 1998, pp 273-278.I.S, (here with a step size of 5 and an embedding rate of 0.1 bpp), and generic LSB.

For these data hiding methods, different random or quasi-random signals were embedded into different images. For generic LSB data hiding, embedding positions were randomly selected for different images. Therefore, this approach may be applied to steganographic tools that use LSB as the message embedding method. Various data embedding rates ranging from 0.3 bpp to as low as 0.01 bpp were applied. This range of embedding rates is comparable to that reported in the aforementioned Lye and Farid for those LSB based stego tools. However, this evaluation might be considered more general due at least in part to embedding position selection.

In this particular experimental evaluation, the threshold T was set to be 4, although, as previously indicated, claimed subject matter is not limited in scope to a fixed threshold value, or an integer value as well. Effective prediction error values in this example range from [−4 to 4], with 9 different values in total. Therefore, the dimension of the transition matrix is 9 by 9, which is 81 features for an error image. Since we have three error images in three different directions, the number of total features is 243 for an image in this particular example, although, again, claimed subject matter is not limited in scope in this respect.

For an image in the image database, stego-images with the above-mentioned data hiding methods were generated. The system was evaluated in turn with the data hiding methods discussed above. A randomly or quasi-randomly selected half of the original set images, and the corresponding stego-images, were used for training. The remaining pairs of original and corresponding stego-images were put through the trained SVM, in this embodiment, to evaluate performance. Here, the detection rate is defined as the ratio of the number of correctly classified images with respect to the number of test images. A test approach was applied 20 times. The following experimental data represents an average of the applications for a test.

Initially, a linear SVM process was applied. Linear SVM has an advantage of relatively fast training. However, it may not perform as well for non-linearly separable patterns. The Matlab SVM code from LIBSVM was used, see C. C. Chang and C. J. Lin, LIBSVM: a library for support vector machines, 2001, http://www.csie.ntu.edu.tw/~cjlin/libsvm. Table 1 provides the test results.

TABLE 1

| Embedding Method | Detection Rates (243D feature, Linear SVM) | | |
| --- | --- | --- | --- |
| | TN | TP | Average |
| Cox's SS | 72.51% | 88.65% | 80.58% |
| Piva's SS | 81.68% | 95.46% | 88.57% |
| QIM (0.1 bpp) | 88.66% | 99.97% | 94.32% |
| LSB (0.3 bpp) | 88.84% | 96.98% | 92.91% |
| LSB (0.2 bpp) | 83.98% | 92.56% | 88.27% |
| LSB (0.1 bpp) | 74.57% | 79.97% | 77.27% |
| LSB (0.05 bpp) | 64.30% | 64.34% | 64.32% |
| LSB (0.02 bpp) | 54.39% | 54.62% | 54.51% |
| LSB (0.01 bpp) | 48.11% | 53.78% | 50.94% |

In Table 1, "TN" stands for "True Negative", here, the detection rate of original cover images. "TP" stands for "True Positive", here, the detection rate of stego-images. "Average" is the arithmetic mean of these two rates. In other words, it is the overall correct classification rate for all test images.

The Markov chain based method described in Sullivan et al. was applied ito the same set of images and the same data hiding methods. The same training and testing procedures were used. The results are listed in Table 2. This data illustrates that, for this example, the embodiment shown outperforms the method from Sullivan et al., in particular, for LSB methods.

TABLE 2

| Embedding Method | Detection Rates (129D feature, Linear SVM) | | |
| --- | --- | --- | --- |
| | TN | TP | Average |
| Cox's SS | 86.64% | 64.98% | 75.81% |
| Piva's SS | 71.34% | 81.34% | 76.34% |
| QIM (0.1 bpp) | 91.43% | 90.07% | 90.75% |
| LSB (0.3 bpp) | 56.69% | 74.66% | 65.68% |

TABLE 2-continued

| Embedding Method | Detection Rates (129D feature, Linear SVM) | | |
| --- | --- | --- | --- |
| | TN | TP | Average |
| LSB (0.2 bpp) | 51.24% | 69.07% | 60.15% |
| LSB (0.1 bpp) | 45.11% | 62.34% | 53.73% |
| LSB (0.05 bpp) | 42.25% | 58.33% | 50.29% |
| LSB (0.02 bpp) | 39.17% | 56.94% | 48.05% |
| LSB (0.01 bpp) | 41.69% | 52.68% | 47.19% |

Likewise, in another evaluation, a polynomial kernel was employed train the 243-D features and the 129-D features from above. The results are listed in Table 3 and Table 4, respectively. Here, in this example, this particular embodiment has a True Positive rate of over 90% for Cox's SS, Piva's blind SS, QIM and LSB with embedding strength over 0.1 bpp. Embedded data here comprises images with sizes ranging from 32×32 to 194×194. Corresponding embedding data rates are from 0.02 bpp to 0.9 bpp and detection rates range from 1.9% to 78%. Thus, compared with the results reported in Lyu and Farid, this particular embodiment appears to outperforms the approach shown in Lyu and Farid.

TABLE 3

| Embedding Method | Detection Rates (243D feature, Poly SVM) | | |
| --- | --- | --- | --- |
| | TN | TP | Average |
| Cox's SS | 84.14% | 94.16% | 89.15% |
| Piva's SS | 89.81% | 98.40% | 94.10% |
| QIM (0.1 bpp) | 94.14% | 99.91% | 97.03% |
| LSB (0.3 bpp) | 96.27% | 99.24% | 97.75% |
| LSB (0.2 bpp) | 91.80% | 97.09% | 94.45% |
| LSB (0.1 bpp) | 83.69% | 88.90% | 86.30% |
| LSB (0.05 bpp) | 72.10% | 78.18% | 75.14% |
| LSB (0.02 bpp) | 57.92% | 61.01% | 59.46% |
| LSB (0.01 bpp) | 52.05% | 52.51% | 52.28% |

TABLE 4

| Embedding Method | Detection Rates (129D feature, Poly SVM) | | |
| --- | --- | --- | --- |
| | TN | TP | Average |
| Cox's SS | 80.54% | 74.67% | 77.60% |
| Piva's SS | 70.07% | 85.10% | 77.58% |
| QIM (0.1 bpp) | 90.20% | 93.73% | 91.96% |
| LSB (0.3 bpp) | 56.88% | 81.09% | 68.98% |
| LSB (0.2 bpp) | 48.21% | 74.05% | 61.13% |
| LSB (0.1 bpp) | 37.16% | 62.47% | 49.82% |
| LSB (0.05 bpp) | 33.33% | 55.44% | 44.38% |
| LSB (0.02 bpp) | 33.41% | 48.21% | 40.81% |
| LSB (0.01 bpp) | 35.88% | 43.21% | 39.54% |

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of processing images, comprising:
training an image classifier to obtain a trained classifier adapted to classify an image as being a stego-image or a non-stego-image, said training comprising:
forming multiple prediction error sets from neighboring samples of a set of known images, a prediction error for each pixel of the error sets being formed by subtracting a predicted pixel value from an original value in a common frame;
thresholding the formed prediction error sets, wherein the thresholding comprises:
comparing the prediction error for each pixel of the error sets to a threshold value; and
maintaining a prediction error value for each prediction error value that is less than the threshold value, the prediction error value being the difference between the predicted pixel value and the original value in the common frame; and
training the image classifier using the thresholded prediction error sets.

2. The method of claim 1, wherein said set of known images comprises one or more stego-images.

3. The method of claim 1, wherein said multiple prediction error sets comprise at least three prediction error images.

4. The method of claim 3, wherein said prediction error images comprise a horizontal prediction error image, a vertical prediction error image and a diagonal prediction error image.

5. The method of claim 1, wherein said thresholding comprises non-uniform thresholding.

6. The method of claim 1, further comprising:
applying said trained classifier to at least one image; and
classifying the content of said at least one image based at least in part on at least one value obtained from application of the trained classifier.

7. The method of claim 6, wherein said classifying comprises classifying said at least one image as being a stego-image or a cover image.

8. The method of claim 1, wherein said classifier is based on analysis of variance.

9. The method of claim 8, wherein said image classifier comprises an SVM process.

10. The method of claim 1, wherein a Markov chain model is applied to a thresholded prediction error set.

11. A non-transitory computer-readable medium having computing device executable instructions stored thereon, the instructions comprising instructions for:
training an image classifier to obtain a trained classifier adapted to classify an image as being a stego-image or a non-stego-image, said training comprising:
forming multiple prediction error sets from neighboring samples of a set of known images, a prediction error for each pixel of the error sets being formed by subtracting a predicted pixel value from an original value in a common frame;
thresholding the formed prediction error sets, wherein the thresholding comprises:
comparing the prediction error for each pixel of the error sets to a threshold value; and
maintaining a prediction error value for each prediction error value that is less than the threshold value, the prediction error value being the difference between the predicted pixel value and the original value in the common frame; and
training the image classifier using the thresholded prediction error sets.

12. The medium of claim 11, wherein said set of known images comprises one or more stego images.

13. The medium of claim 11, wherein said image classifier comprises an SVM process.

14. The medium of claim 11, wherein said multiple prediction error sets comprise at least three prediction error images.

15. The medium of claim 14, wherein said prediction error images comprise a horizontal prediction error image, a vertical prediction error image and a diagonal prediction error image.

16. The medium of claim 11, wherein said thresholding comprises non-uniform thresholding.

17. The medium of claim 11, wherein said instructions further comprise instructions for:
applying said trained classifier to at least one image; and
classifying the content of said at least one image based at least in part on at least one value obtained from application of the trained classifier.

18. The medium of claim 11, wherein said classifier is based on analysis of variance.

19. An apparatus comprising:

means for training an image classifier, to obtain a trained classifier adapted to classify an image as being a stego-image or a non-stego-image, said means for training comprising:
  means for forming multiple prediction error sets from neighboring samples of a set of known images, a prediction error for each pixel of the error sets being formed by subtracting a predicted pixel value from an original value in a common frame;
  means for thresholding the formed prediction error sets, wherein the means for thresholding comprises:
    means for comparing the prediction error for each pixel of the error sets to a threshold value; and
    means for maintaining a prediction error value for each prediction error value that is less than the threshold value, the prediction error value being the difference between the predicted pixel value and the original value in the common frame; and
  means for training the image classifier using the thresholded prediction error sets.

20. The apparatus of claim 19, wherein said set of known images comprises one or more marked images.

21. The apparatus of claim 19, wherein said means for said thresholding comprises means for non-uniform thresholding.

22. The apparatus of claim 19, further comprising:
  means for applying said trained classifier to at least one image; and
  means for classifying the content of said at least one image based at least in part on at least one value obtained from application of the trained classifier.

23. The apparatus of claim 19, wherein said classifier is based on analysis of variance.

24. The apparatus of claim 23, wherein said image classifier comprises an SVM process.

25. An electronic computing device comprising:
  at least one processor to train an image classifier, to obtain a trained classifier adapted to classify an image as being a stego-image or a non-stego-image, said processor comprises:
    a unit to form multiple prediction error sets from neighboring samples of a set of known images, a prediction error for each pixel of the error sets being formed by subtracting a predicted pixel value from an original value in a common frame;
    a unit to threshold the formed prediction error sets, wherein the unit to threshold the formed prediction error sets comprises:
      a unit to compare the prediction error for each pixel of the error sets to a threshold value; and
      a unit to maintain a prediction error value for each prediction error value that is less than the threshold value, the prediction error value being the difference between the predicted pixel value and the original value in the common frame; and
    a unit to train the image classifier using the thresholded prediction error sets.

26. A method of processing images, comprising:
using a processor of a computing device to train an image classifier to obtain a trained classifier adapted to classify an image as being a stego-image or a non-stego-image, said training comprising:
  forming multiple prediction error sets from neighboring samples of a set of known images, a prediction error for each pixel of the error sets being formed by subtracting a predicted pixel value from an original value in a common frame;
  thresholding the formed prediction error sets, wherein the thresholding comprises:
    comparing the prediction error for each pixel of the error sets to a threshold value; and
    maintaining a prediction error value for each prediction error value that is less than the threshold value, the prediction error value being the difference between the predicted pixel value and the original value in the common frame; and
  training the image classifier using the thresholded prediction error sets.

* * * * *

UNITED STATES PATENT AND TRADEMARK OFFICE
CERTIFICATE OF CORRECTION

PATENT NO. : 8,224,017 B2  
APPLICATION NO. : 11/331688  
DATED : July 17, 2012  
INVENTOR(S) : Shi et al.

Page 1 of 1

It is certified that error appears in the above-identified patent and that said Letters Patent is hereby corrected as shown below:

On the Title Page, item (56), under "OTHER PUBLICATIONS", in Column 2, Line 8, delete "steganographytechniques"," and insert -- steganography techniques", --, therefor.

On the Title Page, item (56), under "OTHER PUBLICATIONS", in Column 2, Line 12, delete "Spectdrum" and insert -- spectrum --, therefor.

On Page 2, item (56), under "OTHER PUBLICATIONS", in Column 1, Line 4, delete "sprectrum" and insert -- spectrum --, therefor.

In Column 6, Lines 25-26, delete "http://vision.ece.ucsb.edu/~sullivaklResearch_imgs/," and insert -- http://vision.ece.ucsb.edu/~sullivak/Research_imgs/, --, therefor.

In Column 7, Line 50, delete "ito the" and insert -- to the --, therefor.

In Column 10, Line 46, in Claim 12, delete "stego images." and insert -- stego-images. --, therefor.

Signed and Sealed this  
Twenty-second Day of January, 2013

David J. Kappos  
*Director of the United States Patent and Trademark Office*